United States Patent [19]

Gruber et al.

[11] Patent Number: 5,264,878
[45] Date of Patent: Nov. 23, 1993

[54] POLYMERS AND HARD, GAS-PERMEABLE CONTACT LENSES MADE THEREFROM

[75] Inventors: Erich Gruber, Marly, Switzerland; Horst Schäfer, Aschaffenburg, Fed. Rep. of Germany; Bernhard Seiferling, Goldbach, Fed. Rep. of Germany; Harro M. von der Haegen, Laufach, Fed. Rep. of Germany

[73] Assignee: Ciba-Geigy Corporation, Ardsley, N.Y.

[21] Appl. No.: 6,085

[22] Filed: Jan. 19, 1993

Related U.S. Application Data

[62] Division of Ser. No. 691,626, Apr. 25, 1991, Pat. No. 5,196,493.

[30] Foreign Application Priority Data

May 2, 1990 [CH] Switzerland ............. 01479/90

[51] Int. Cl.$^5$ .............................. G02C 7/04
[52] U.S. Cl. ....................... 351/160 R; 351/160 H
[58] Field of Search ................. 351/160 R, 160 H

[56] References Cited

U.S. PATENT DOCUMENTS

| | | | |
|---|---|---|---|
| 4,136,250 | 1/1979 | Mueller et al. | 528/29 |
| 4,433,125 | 2/1984 | Ichinohe et al. | 526/279 |
| 4,540,761 | 9/1985 | Kawamura et al. | 526/245 |
| 4,661,573 | 4/1987 | Ratkowski et al. | 526/245 |
| 4,748,224 | 5/1988 | Novicky | 526/242 |
| 4,766,189 | 8/1988 | Tsuetaki et al. | 526/245 |
| 4,769,431 | 9/1988 | Ratkowski | 526/279 |
| 4,780,515 | 10/1988 | Diechert | 526/245 |
| 4,996,275 | 2/1991 | Ellis et al. | 526/245 |
| 5,032,658 | 7/1991 | Baron et al. | 526/245 |

FOREIGN PATENT DOCUMENTS

| | | |
|---|---|---|
| 0219312 | 4/1987 | European Pat. Off. |
| 0277771 | 8/1988 | European Pat. Off. |
| 0294515 | 12/1988 | European Pat. Off. |
| 0424099 | 4/1991 | European Pat. Off. |
| 8805060 | 7/1988 | World Int. Prop. O. |

Primary Examiner—Joseph L. Schofer
Assistant Examiner—N. Sarofim
Attorney, Agent, or Firm—Edward McC. Roberts; William G. Hervey

[57] ABSTRACT

The present invention relates to novel polymers, to processes for the preparation thereof, to contact lenses consisting substantially of those polymers and to processes for the manufacture thereof and to the use of the novel polymers for the manufacture of contact lenses. The polymers according to the invention are especially the copolymerisation products of monomer mixtures comprising the following monomers:

| | | |
|---|---|---|
| a) | 20–60% | siloxane monovinyl component |
| b) | 1–25% | siloxane oligovinyl component |
| c) | 10–55% | fluorine-containing vinyl component |
| d) | 3–30% | hydrophobic vinyl component having a bulky hydrocarbon radical, |
| e) | 0–10% | hydrophilic vinyl component |
| f) | 0–15% | additional cross-linking vinyl component. |

The novel polymers and the contact lenses made therefrom are distinguished by a high degree of hardness while at the same time being highly permeable to oxygen.

1 Claim, No Drawings

POLYMERS AND HARD, GAS-PERMEABLE CONTACT LENSES MADE THEREFROM

This is a DIVISIONAL of Ser. No. 07/691,626, filed Apr. 25, 1991, now U.S. Pat. No. 5,196,493.

The present invention relates to novel polymers, to processes for the preparation thereof, to contact lenses consisting substantially of those polymers and to processes for the manufacture thereof and to the use of the novel polymers for the manufacture of contact lenses. The novel polymers and the contact lenses made therefrom are distinguished by a high degree of hardness while at the same time being highly permeable to oxygen. These advantageous material properties are obtained by using for the preparation of the polymers a hydrophobic monomer component having a bulky hydrocarbon radical together with a siloxane monovinyl component, a siloxane oligovinyl component, a fluorine-containing vinyl component and, if desired, a hydrophilic vinyl component and/or an additional cross-linking vinyl component.

It has already been proposed to manufacture contact lenses from polymers that comprise a siloxane monovinyl component, polysiloxane dimethacrylates, fluoroalkyl methacrylates and hydrophilic vinyl monomers, for example in EP-A-277 771 or WO 88/05060. It has also already been proposed to use polymers based on siloxane monovinyl components, fluoroalkyl methacrylates, hydrophobic alkyl or cycloalkyl methacrylates and hydrophilic vinyl monomers for the manufacture of contact lenses, for example in EP 294 515 or U.S. Pat. No. 4,540,761 and 4,433,125.

Where the hydrophobic vinyl monomer used therein is not the almost classic methyl methacrylate, those specifications mention, for example, monomers such as tert-butyl methacrylate, 2-ethylhexyl methacrylate or cyclohexyl methacrylate.

It has clearly not been recognised hitherto that the use of specific hydrophobic monomer components having a bulky hydrocarbon radical, as defined below, is especially advantageous. This is especially the case when the monomers having a bulky hydrocarbon radical are copolymerised in combination with one or more representatives of the siloxane monovinyl component, siloxane oligovinyl component and fluorine-containing vinyl component categories. Specific material properties can be additionally favourably influenced when a hydrophilic vinyl component and/or an additional cross-linking component are/is added to the mixture to be polymerised.

A significant feature of the present invention is that the hydrophobic component having the bulky hydrocarbon radical together with the three other obligatory components gives rise to a synergistic effect not observed hitherto, which imparts to the polymers obtainable in accordance with the invention both a high degree of hardness and high permeability to oxygen.

For example, a 1:1 copolymer consisting of a typical component having a bulky hydrocarbon radical and methyl methacrylate (MMA) has an oxygen permeability (Dk value) of 11 and a ball indentation hardness (BIH) of 177. If MMA is replaced by a typical fluorine-containing component, the Dk value is virtually unaltered, but the ball indentation hardness is reduced. Reference is made in this connection to Comparison Examples 1 to 3.

The known positive effect of siloxane groups and fluorine-containing groups on the properties of contact lenses is limited to an increase in the Dk values and does not have a beneficial effect on the hardness.

In contrast, the polymers according to the invention exhibit ball indentation hardness values which allow mechanical processing in the required manner, and at the same time they have high Dk values. In comparison with polymers that contain methyl methacrylate instead of the hydrophobic vinyl component having a bulky hydrocarbon radical but are otherwise of the same composition, the Dk value increases superproportionally while the hardness remains the same. Reference is made in this connection to Examples 1 to 3 (polymers according to the invention) and Comparison Examples 4 to 7 in which MMA is used. For example, the pair Example 1/Comparison Example 4 have comparable hardness (74 and 78, respectively) but the Dk value of the MMA copolymer is 34 whereas that of the copolymer according to the invention is 57. The same is true of the pairs Example 2/Comparison Example 5 and Example 3/Comparison Example 6.

The invention therefore relates to polymers that are copolymerisation products of monomer mixtures comprising the following monomers:
a) a siloxane monovinyl component,
b) a siloxane oligovinyl component,
c) a fluorine-containing vinyl component,
d) a hydrophobic vinyl component having a bulky hydrocarbon radical, and, in addition, possibly but not necessarily,
e) a hydrophilic vinyl component and
f) an additional cross-linking component.

The term "vinyl" in the context of this invention does not denote exclusively the grouping "—CH=CH$_2$". Instead, the term includes olefinically unsaturated copolymerisable groups, such as those typically occurring in monomers that are used for contact lenses. "Vinyl" therefore includes the corresponding radicals of acrylic and methacrylic acid derivatives, and also those of derivatives of crotonic acid, fumaric acid, maleic acid and itaconic acid, but this list is not exhaustive.

The invention relates especially to polymers that are copolymerisation products of monomer mixtures comprising the following monomers:
a) a siloxane monovinyl component of formula I

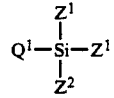

wherein $Q^1$ is a radical of the partial formula

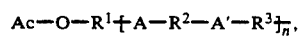

Ac is the acyl radical of a vinylically unsaturated carboxylic acid having from 3 to 5 carbon atoms, $R^1$ and $R^2$ are each independently of the other lower alkylene, cycloalkylene, arylene or a combination of lower alkylene with cycloalkylene or lower alkylene with arylene, $R^3$ is lower alkylene or cycloalkylene, A and A' are each independently of the other $X^1$—CO—$X^2$, $X^2$ in each case being bonded to $R^2$, and $X^2$ is —NH— or a bond and $X^1$ is —O—, or —NR— wherein R is lower alkyl, wherein the radicals $Z^1$ are each independently of the other $OSi(R^4)_3$ wherein the radicals $R^4$ are each independently of the others lower alkyl, phenyl or OSi(-lower alkyl)$_3$, $Z^2$ is lower alkyl, phenyl or $Z^1$, and n is 0 or 1, b) a siloxane oligovinyl component of formula II

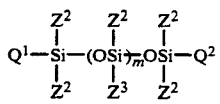

wherein $Q^2$ has the same meaning as $Q^1$ or is Ac—O, wherein $Q^1$, Ac and $Z^2$ are as defined above, $Z^3$ is $Z^2$ or has the same meaning as $Q^2$ and m is 0 to 4, c) a fluorine-containing vinyl component of formula IIIa

wherein Ac is as defined above, $R^5$ is $C_1$-$C_4$alkylene or cycloalkylene, $R^6$ is fluorinated lower alkyl having at least 3 fluorine atoms or wherein $R^5$—$R^6$ together are hexafluoroisopropyl or nonafluoro-tert-butyl, or of formula IIIb

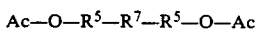

wherein Ac and $R^5$ are as defined above and $R^7$ is fluorinated $C_1$-$C_{10}$alkylene, or of formula IIIc

wherein Ac is as defined above and $R^8$ is phenylene that is unsubstituted or substituted by lower alkyl, fluorine or by fluorinated lower alkyl having at least 3 fluorine atoms, or of formula IIId

wherein Ac is as defined above, $R^9$ is perfluorinated $C_1$-$C_{10}$alkyl and p is 0, 1 or 2, or of formula IIIe

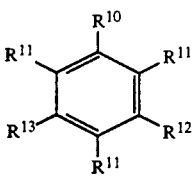

wherein $R^{10}$ is $C_2$-$C_6$alkenyl having the double bond in conjugation to the phenyl ring, the radicals $R^{11}$ are each independently of the others hydrogen or fluorine, $R^{12}$ is fluorinated lower alkyl having at least 3 fluorine atoms and $R^{13}$ is hydrogen or fluorine or has the same meaning as $R^{12}$, and d) a hydrophobic vinyl component having a bulky hydrocarbon radical of formula IVa

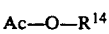

wherein Ac is as defined above and $R^{14}$ is lower alkyl-substituted cycloalkyl, lower alkyl-substituted cycloalkyl-lower alkyl, unsubstituted or lower alkyl-substituted di- or oligo-cycloalkyl, unsubstituted or lower alkyl-substituted di- or oligo-cycloalkyl-lower alkyl, or $C_5$-$C_{10}$alkyl that contains at least one tert-butyl group and is unsubstituted or substituted by cycloalkyl, or of formula IVb

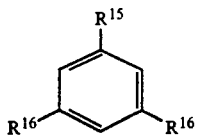

wherein $R^{15}$ is $C_2$-$C_6$alkenyl having the double bond in conjugation to the phenyl ring and $R^{16}$ is hydrogen or has the same meaning as $R^{14}$, but at least one radical $R^{16}$ is other than hydrogen.

Other components which may be present if desired are defined below.

Hereinabove and hereinbelow the term "lower" in connection with substituents or radicals, for example lower alkyl, denotes a group having up to 7 carbon atoms, preferably up to 4 carbon atoms.

The acyl radical "Ac" of a vinylically unsaturated carboxylic acid having from 3 to 5 carbon atoms preferably has 3 or 4 carbon atoms and is, for example, acryloyl, methacryloyl, crotonoyl, or the acyl radical of a vinylically unsaturated dicarboxylic acid, such as maleic acid, fumaric acid or itaconic acid, and in the acyl radicals of dicarboxylic acids the second carboxylic acid group is either free or, preferably, is esterified by a lower alkanol. Preferred acyl radicals "Ac" are acryloyl and methacryloyl, especially methacryloyl.

Lower alkylene $R^1$ and $R^2$ has up to 7 carbon atoms, preferably up to 4 carbon atoms, and is, for example, methylene, ethylene, 1,3-propylene, 1,2-propylene, 1,4-butylene or 1,6-hexylene.

Cycloalkylene $R^1$ and $R^2$ has from 5 to 7 ring carbon atoms, is unsubstituted or substituted by carboxy or by lower alkyl and is, for example, cyclopentylene, carboxycyclopentylene, cyclohexylene, cycloheptylene, methylcyclohexylene, dimethylcyclohexylene or trimethylcyclohexylene.

Arylene $R^1$ and $R^2$ has, for example, 6 or 12 ring carbon atoms, such as phenylene, biphenylene or naphthylene, is unsubstituted or substituted by lower alkyl, halogen or by lower alkoxy and is, for example, phenylene, methylphenylene or tert-butylphenylene, biphenylene, dimethoxybiphenylene, dimethylbiphenylene, naphthylene or methylnaphthylene.

Halogen is especially bromine or chlorine, but may also be fluorine or iodine.

Lower alkoxy has especially up to 7 carbon atoms and is, for example, methoxy, ethoxy or propoxy.

When $R^1$ and $R^2$ are a combination of lower alkylene with cycloalkylene or with arylene, those radicals are, for example, lower alkylene-cycloalkylene, lower alkylene-cycloalkylene-lower alkylene, cycloalkylene-lower alkylene-cycloalkylene, lower alkylene-arylene or lower alkylene-arylene-lower alkylene. Examples thereof are methylene-cyclohexylene or cyclohexylene-methylene which are unsubstituted or substituted by from 1 to 3 lower alkyl groups, for example trimethylcyclohexylene-methylene, methylene-cyclohexylene-methylene, phenylene-methylene, phenylene-ethylene, methylene-phenylene-methylene or butylene-phenylene-butylene.

Lower alkylene and cycloalkylene $R^3$ are as defined above for $R^1$ and $R^2$.

$R^1$ and $R^3$ are preferably lower alkylene, especially lower alkylene having 2 or 3 carbon atoms.

$R^2$ is preferably arylene, cycloalkylene or a combination of one of those two radicals with lower alkylene, as defined above.

The partial structure $-CO-X^2-R^2-X^2-CO-$ is preferably the divalent radical of a diisocyanate ($X^2$=NH) or of a diester ($X^2$ is a bond). $X^2$ is preferably $-NH-$. Suitable isocyanates that yield the partial structure $-CO-X^2-R^2-X^2-CO-$ wherein $X^2$ is $-NH-$ are, for example, ethylene diisocyanate, 1,2-diisocyanatopropane, 1,3-diisocyanatopropane, 1,6-diisocyanatohexane, 1,2-diisocyanatocyclohexane, 1,3-diisocyanatocyclohexane, 1,4-diisocyanatocyclohexane, o-diisocyanatobenzene, m-diisocyanatobenzene, p-diisocyanatobenzene, bis(4-isocyanatocyclohexyl)methane, bis(4-isocyanatocyclohexenyl)methane, bis(4-isocyanatophenyl)methane, toluylene-diisocyanate, 3,3-dichloro-4,4'-diisocyanatobiphenyl, tris(4-isocyanatophenyl)methane, hydrogenated toluylene-diisocyanate, 1-isocyanatomethyl-5-isocyanato-1,3,3-trimethylcyclohexane (=isophorone diisocyanate), 1,3,5-tris(6-isocyanatohexyl)biuret, 1,6-diisocyanato-(2,2,4)-trimethylhexane, 2,2'-diisocyanatodiethyl fumarate, 1,5-diisocyanato-1-carboxypentane, 1,2-, 1,3-, 1,5-, 1,6-, 1,7-, 1,8-, 2,7- and 2,3-diisocyanatonaphthalene, 2,4- and 2,7-diisocyanato-1-methylnaphthalene, 1,4-diisocyanato-methylcyclohexane, 1,3-diisocyanato-6(7)-methylnaphthalene, 4,4'-diisocyanatobiphenyl, 4,4'-diisocyanato-3,3'-dimethoxybiphenyl, 3,3'- and 4,4'-diisocyanato-2,2'-dimethylbiphenyl, bis(4-isocyanatophenyl)ethane and bis(4-isocyanatophenyl) ether. Preferred diisocyanates are tolylene-2,4-diisocyanate and isophorone diisocyanate.

Lower alkyl $R^4$ or within the definition OSi(lower alkyl)$_3$ of $R^4$ or lower alkyl $Z^2$ is, for example, methyl, ethyl, propyl or butyl, preferably methyl.

$Z^1$ is preferably trimethylsilyloxy or tris(trimethylsilyloxy)silyloxy. $Z^2$ preferably has the same meaning as $Z^1$. The index n is preferably 0.

$Q^2$ is preferably $Q^1$ wherein n is 0. The index m is especially 0.

$R^5$ is $C_1$-$C_4$alkylene or cycloalkylene having 5, 6 or 7 ring members, for example methylene, ethylene, propylene or cyclohexylene, preferably methylene.

Fluorinated lower alkyl having at least 3 fluorine atoms $R^6$ is, for example, trifluoromethyl, heptafluoropropyl, nonafluoro-tert-butyl, ω-H-tetrafluoroethyl or ω-H-octafluorobutyl.

Fluorinated $C_1$-$C_{10}$alkylene $R^7$ is perfluorinated or partially fluorinated and is, for example, linear perfluoroalkylene having 2, 3, 4 or 6 carbon atoms, perfluorinated 1,2-propylene, 2,2-propylene, 1,3-butylene, 1,2-butylene or 2,2,2-trifluoro-1,1-ethylene or 3,3,3-trifluoro-1,2-propylene.

Phenylene $R^8$ is preferably unsubstituted phenylene or phenylene that is substituted by one or two radicals of the fluorine or trifluoromethyl category.

The index p is especially 1.

Perfluorinated $C_1$-$C_{10}$alkyl $R^9$ is, for example, perfluorinated lower alkyl, such as defined above for $R^6$, and is especially perfluorobutyl, perfluoropentyl, perfluorohexyl or perfluoroheptyl, especially perfluorohexyl.

$R^{10}$ as $C_2$-$C_6$alkenyl having a double bond in conjugation to the phenyl ring of formula IIIe is, for example, vinyl ($-CH=CH_2$), 1-methylvinyl or 2-methylvinyl, preferably vinyl. The same definition applies to $R^{15}$ in formula IVb.

$R^{12}$ has especially the meanings given above for $R^6$.

Lower alkyl-substituted cycloalkyl $R^{14}$ is, for example, correspondingly substituted $C_5$-$C_7$cycloalkyl, such as cyclopentyl, cyclohexyl or cycloheptyl, which is substituted by from one to five lower alkyl groups. Preferred substituents are $C_1$-$C_4$alkyl groups, especially methyl. Cycloalkyl $R^{14}$ is preferably at least monosubstituted, preferably polysubstituted, in the 3-position by lower alkyl. Cyclohexyl di- to tetra-substituted by lower alkyl, for example methyl, for example 3,5-dimethylcyclohexyl, 3,3,5-trimethylcyclohexyl or 3,3,5,5-tetramethylcyclohexyl, is especially suitable.

Lower alkyl-substituted cycloalkyl-lower alkyl $R^{14}$ denotes a radical as defined above that is bonded via lower alkyl, especially methyl, that is to say, for example, trimethylcyclohexylmethyl, such as 3,3,5-trimethylcyclohexylmethyl.

Unsubstituted or lower alkyl-substituted di- or oligocycloalkyl $R^{14}$ is to be understood as being an unsubstituted or lower alkyl-substituted di-, tri- or tetra-cyclic hydrocarbon radical. Such a radical has preferably five or six ring members per ring. The sum of the ring members preferably totals from seven to twelve carbon atoms. Preferred radicals $R^{14}$ are, for example, bicyclo[2.2.1]heptyl, bicyclo[2.2.2]octyl, tricyclo[5.2.1.0$^{2.6}$]decyl, adamantyl, bornyl and isobornyl.

Unsubstituted or lower alkyl-substituted di- or oligocycloalkyl-lower alkyl $R^{14}$ is a radical as described in the preceding paragraph that is bonded via lower alkyl, especially via methyl, that is to say, for example, tricyclo[5.2.1.0$^{2.6}$]decylmethyl or adamantylmethyl.

$C_5$-$C_{10}$alkyl that contains at least one tert-butyl group and is unsubstituted or substituted by cycloalkyl is especially tert-butyl-$C_1$-$C_6$alkyl, such as tert-butylmethyl, 2-tert-butylethyl or 2-tert-butyl-2-cyclohexylethyl.

Preferred siloxane monovinyl components a) in the compositions according to the invention are compounds of formula I wherein Ac is the acyl radical of a vinylically unsaturated carboxylic acid having three or four carbon atoms, $R^1$ is lower alkylene, n is 0, $Z^2$ has the same meaning as $Z^1$ and the radicals $Z^1$ are each independently of the other OSi($R^4$)$_3$ wherein the radicals $R^4$ are each independently of the others lower alkyl or OSi(lower alkyl)$_3$.

Also preferred as siloxane monovinyl components a) are compounds of formula I wherein n is 1 and the other variables mentioned in the above paragraph are as defined therein, $X^1$ is O and $X^2$ is NH, $R^2$ is unsubstituted or lower alkyl-substituted phenylene, or lower alkyl-substituted cycloalkylene-lower alkylene, and $R^3$ is lower alkylene.

Especially preferred are compounds of formula I wherein Ac is acryloyl or methacryloyl, $R^1$ is $C_2$-$C_4$alkylene, n is 0, $Z^2$ has the same meaning as $Z^1$ and $Z^1$ is OSi($R^4$)$_3$ wherein $R^4$ is $C_1$-$C_4$alkyl or OSi($C_1$-$C_4$alkyl)$_3$. Individual compounds that should be given special mention are, for example, tris(trimethylsiloxy)silylpropyl methacrylate and tris(tris(trimethylsiloxy)siloxy)silylpropyl methacrylate.

Special preference is given also to compounds of formula I wherein n is 1 and the other variables mentioned in the above paragraph are as defined therein, $X^1$ is O and $X^2$ is NH, $R^2$ is phenylene, $C_1$-$C_4$alkyl-substituted phenylene or $C_1$-$C_4$alkyl-substituted cyclohexylene-$C_1$-$C_4$alkylene and $R^3$ is $C_2$-$C_4$alkylene.

Such compounds that should be given special mention are those in which $R^2$ is the bivalent hydrocarbon radical of tolylene-diisocyanate or isophorone diisocyanate.

Preferred siloxane oligovinyl components b) in the compositions according to the invention are compounds of formula II wherein $Q^2$ is $Q^1$, wherein n is 0, and wherein Ac is the acyl radical of a vinylically unsaturated carboxylic acid having 3 or 4 carbon atoms, $R^1$ is lower alkylene, m is 0 and the radicals $Z^2$ are each independently of the others lower alkyl or $OSi(R^4)_3$ wherein $R^4$ is lower alkyl.

Special preference is given to compounds of formula II wherein $Q^2$ is $Q^1$, wherein n is 0, and wherein Ac is acryloyl or methacryloyl, $R^1$ is $C_1$–$C_4$alkylene and $Z^2$ is $C_1$–$C_4$alkyl or $OSi(R^4)_3$ wherein $R^4$ is $C_1$–$C_4$alkyl. Individual compounds that should be given special mention are, for example, 3,5-bis(3-methacroyloxypropyl)-3,5-bis(trimethylsiloxy)-1,1,1,7,7,7-hexamethyltetrasiloxane and 1,3-dimethacryloxypropyltetramethyldisiloxane.

In the case of the fluorine-containing vinyl components c) it is especially preferred that Ac is other than the acyl radical of itaconic acid.

Preferred fluorine-containing vinyl components c) in the compositions according to the invention are compounds of formula IIIa, b, c, d or e wherein Ac is the acyl radical of a vinylically unsaturated carboxylic acid having 3 or 4 carbon atoms, $R^5$ is $C_1$–$C_3$alkylene and $R^6$ is fluorinated lower alkyl having at least 3 fluorine atoms, or $R^5$–$R^6$ together are hexafluoroisopropyl or nonafluoro-tert-butyl, $R^7$ is fluorinated lower alkylene, $R^8$ is phenylene, p is 1, $R^9$ is perfluorinated $C_4$–$C_8$alkyl, $R^{10}$ is $C_2$–$C_3$alkenyl, $R^{11}$ and $R^{13}$ are hydrogen and $R^{12}$ is fluorinated lower alkyl having at least 3 fluorine atoms.

Special preference is given to compounds of formula IIIa wherein Ac is acryloyl or methacryloyl, $R^5$ is $C_1$–$C_2$alkylene and $R^6$ is fluorinated $C_1$–$C_4$alkyl having at least 3 fluorine atoms or $R^5$–$R^6$ together are hexafluoroisopropyl. Individual compounds that should be given special mention are, for example, 2,2,2-trifluoroethyl methacrylate, 2,2,3,3-tetrafluoropropyl methacrylate, 2,2,3,3,4,4,5,5-octafluoropentyl methacrylate and hexafluoroisopropyl methacrylate.

Special preference is given also to compounds of formula IIIb wherein Ac is acryloyl or methacryloyl, $R^5$ is $C_1$–$C_2$alkylene and $R^7$ is fluorinated $C_1$–$C_4$alkylene, compounds of formula IIIc wherein Ac is acryloyl or methacryloyl and $R^8$ is phenylene, compounds of formula IIId wherein Ac is acryloyl or methacryloyl, p is 1 and $R^9$ is perfluorinated $C_5$–$C_7$alkyl and compounds of formula IIIe wherein $R^{10}$ is vinyl or 1-methylvinyl, $R^{11}$ and $R^{13}$ are hydrogen and $R^{12}$ is fluorinated $C_1$–$C_4$alkyl having at least 3 fluorine atoms. Individual compounds that should be given special mention are, for example, hexafluoro-bisphenol-A bismethacrylate and tridecafluorononanediol methacrylate (compound of formula IIId wherein $R^9$ is tridecafluorohexyl).

Preferred hydrophobic vinyl components having a bulky hydrocarbon radical d) are compounds of formula IVa wherein Ac is the acyl radical of a vinylically unsaturated carboxylic acid having 3 or 4 carbon atoms and $R^{14}$ is lower alkyl-substituted cycloakyl, unsubstituted or lower alkyl-substituted di- or tri-cycloalkyl, unsubstituted or lower alkyl-substituted bicycloalkyl-lower alkyl or tricycloalkyl-lower alkyl, or tert-butyl-substituted $C_1$–$C_4$alkyl.

Special preference is given to compounds of formula IVa wherein Ac is acryloyl or methacryloyl and $R^{14}$ is $C_1$–$C_4$alkyl-substituted cyclohexyl, unsubstituted or $C_1$–$C_4$alkyl-substituted $C_7$–$C_{12}$bi- or $C_7$–$C_{12}$tri-cycloalkyl, unsubstituted or $C_1$–$C_4$alkyl-substituted $C_7$–$C_{12}$bi- or $C_7$–$C_{12}$tri-cycloalkyl-$C_1$–$C_4$alkyl, or tert-butyl-substituted $C_1$–$C_4$alkyl.

Preference is given especially to compounds of formula IVa wherein Ac is acryloyl or methacryloyl and $R^{14}$ is cyclohexyl that is di- to tetra-substituted by $C_1$–$C_4$alkyl, especially methyl, bicyclo[x.y.z]heptyl or bicyclo[x.y.z]octyl each of which is unsubstituted or di- to tetra-substituted by $C_1$–$C_4$alkyl, wherein x, y and z are in each case 0 or a natural number, the sum of x, y and z being 5 in the case of the heptyl compounds and 6 in the case of the octyl compounds, tricyclo[w.x.y.z]decyl or tricyclo[w.x.y.z]decyl-$C_1$–$C_4$alkyl wherein w, x, y and z are in each case 0 or a natural number, the sum of w, x, y and z being 8, or $C_1$–$C_4$alkyl monosubstituted by tert-butyl.

Very special preference is given to compounds of formula IVa wherein Ac is acryloyl or methacryloyl and $R^{14}$ is trimethylcyclohexyl, bicyclo[2.2.1]heptyl, bicyclo[2.2.2]octyl, bornyl, isobornyl, tricyclo[5.2.1.0$^{2.6}$]decyl, adamantyl, tricyclo[5.2.1.0$^{2.6}$]decylmethyl, adamantylmethyl, tert-butyl-methyl (2,2-dimethylpropyl) or 2-tert-butylethyl (3,3-dimethylpropyl). Individual compounds that should be given special mention are 3,3,5-trimethylcyclohexyl methacrylate, isobornyl methacrylate, neopentyl methacrylate and tricyclo[5.2.1.0]decyl methacrylate.

Hydrophobic vinyl components having a bulky hydrocarbon radical d) that are likewise preferred are compounds of formula IVb wherein $R^{15}$ is $C_2$–$C_3$alkenyl and $R^{16}$ is hydrogen or lower alkyl-substituted cycloalkyl, unsubstituted or lower alkyl-substituted di- or tricycloalkyl, unsubstituted or lower alkyl-substituted bicycloalkyl-lower alkyl or tricycloalkyl-lower alkyl, or tert-butyl-substituted $C_1$–$C_4$alkyl, but at least one radical $R^{16}$ is other than hydrogen. Of those compounds of formula IVb, special preference is given to those compounds wherein one radical $R^{16}$ is hydrogen and the other radical $R^{16}$ is other than hydrogen.

Preference is given especially to compounds of formula IVb wherein $R^{15}$ is vinyl or 1-methylvinyl, one radical $R^{16}$ is hydrogen and the other radical $R^{16}$ is cyclohexyl that is di- to tetra-substituted by $C_1$–$C_4$alkyl, especially methyl, bicyclo[x.y.z]heptyl or bicyclo[x.y.z]octyl each of which is unsubstituted or di- to tetra-substituted by $C_1$–$C_4$alkyl, wherein x, y and z are in each case 0 or a natural number, the sum of x, y and z being 5 in the case of the heptyl compounds and 6 in the case of the octyl compounds, tricyclo[w.x.y.z]decyl or tricyclo[w.x.y.z]decyl-$C_1$–$C_4$alkyl wherein w, x, y and z are in each case 0 or a natural number, the sum of w, x, y and z being 8, or $C_1$–$C_4$alkyl monosubstituted by tert-butyl.

As has already been mentioned, the polymers according to the invention may additionally comprise a hydrophilic vinyl component and/or an additional cross-linking component.

Suitable hydrophilic vinyl components e) are compounds of the formula

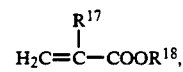

wherein $R^{17}$ is hydrogen or methyl and $R^{18}$ is a hydrocarbon radical having from 1 to 10 carbon atoms that is mono- or poly-substituted by a group imparting water-solubility, such as carboxy, hydroxy or tert-amino, for example tert-lower alkylamino having from 1 to 7 carbon atoms per lower alkyl group, a polyethylene oxide group having from 2 to 100 recurring units, preferably having from 2 to 40 recurring units, or a sulfate, phosphate, sulfonate or phosphonate group, for example a correspondingly substituted alkyl, cycloalkyl or phenyl radical or a combination of such radicals, such as phenylalkyl or alkylcycloalkyl, and also acrylamides and methacrylamides of the formula

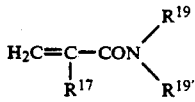

wherein $R^{19}$ is hydrogen or $C_1$–$C_4$alkyl; acrylamides and methacrylamides of the formula

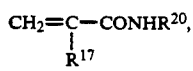

wherein $R^{20}$ has the same meaning as $R^{18}$ or $R^{19}$; maleinates and fumarates of the formula

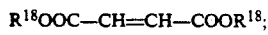

crotonates of the formula

vinyl ethers of the formula

vinyl-substituted five- or six-membered heterocycles having one or two nitrogen atoms, and also N-vinyllactams, such as N-vinyl-2-pyrrolidone, and vinylically unsaturated carboxylic acids having a total of from 3 to 10 carbon atoms, such as methacrylic acid, crotonic acid, fumaric acid or cinnamic acid.

Preferred are, for example, hydroxy-substituted $C_2$–$C_4$alkyl(methy)acrylates, five- to seven-membered N-vinyllactams, N,N-di-$C_1$–$C_4$alkyl(meth)acrylamides and vinylically unsaturated carboxylic acids having a total of from 3 to 5 carbon atoms.

Hydrophilic monomers e) that may be used include: 2-hydroxyethyl, 2- and 3-hydroxypropyl, 2,3-dihydroxypropyl, polyethoxyethyl and polyethoxypropyl acrylates and methacrylates and also the corresponding acrylamides and methacrylamides, acrylamide and methacrylamide, N-methyl-acrylamide and -methyacrylamide, bisacetoneacrylamide, 2-hydroxyethylacrylamide, dimethyl-acrylamide and -methacrylamide and also methylol-acrylamide and -methacrylamide, N,N-dimethyl- and N,N-diethylaminoethyl acrylate and methacrylate and also the corresponding acrylamides and methacrylamides, N-tert-butylaminoethyl methacrylate and methacrylamide, 2- and 4-vinylpyridine, 4- and 2-methyl-5-vinylpyridine, N-methyl-4-vinylpiperidine, 1-vinyl- and 2-methyl-1-vinyl-imidazole, dimethylallylamine and methyldiallylamine and also para-, meta- and ortho-aminostyrene, dimethylaminoethyl vinyl ether, N-vinylpyrrolidone and 2-pyrrolidinoethyl methacrylate, acrylic and methacrylic acid, itaconic acid, cinnamic acid, crotonic acid, fumaric acid, maleic acid and the hydroxy-lower alkyl mono-and di-esters thereof, such as 2-hydroxyethyl and di-(2-hydroxy)-ethyl fumarate, maleinate and itaconate, and also 3-hydroxypropylbutyl fumarate and di-polyalkoxyalkyl fumarates, maleinates and itaconates, maleic acid anhydride, sodium acrylate and methacrylate, 2-methacryloyloxyethylsulfonic acid, 2-acrylamido-2-methylpropanesulfonic acid, 2-phosphatoethyl methacrylate, vinylsulfonic acid, sodium vinyl sulfonate, p-styrenesulfonic acid, sodium p-styrenesulfonate and allylsulfonic acid, N-vinylpyrrolidone, N-vinylpyridone, N-vinylcarprolactam, and also the quaternised derivatives of cationic monomers, which are obtained by quaternisation with selected alkylating agents, for example halogenated hydrocarbons, such as methyl iodide, benzyl chloride or hexadecyl chloride, epoxides, such as glycidol, epichlorohydrin or ethylene oxide, acrylic acid, dimethyl sulfate, methyl sulfate and propanesultone.

Preferred monomers e) are 2-hydroxyethyl methacrylate, N-vinyl-2-pyrrolidone, N,N-dimethylacrylamide and also acrylic and methacrylic acid.

The additional cross-linking components f) are, for example, di-, tri- or tetra-olefinic, especially diolefinic, monomers, for example allyl acrylate and methacrylate, ethylene glycol, diethylene glycol, triethylene glycol, tetraethylene glycol and generally polyethylene oxide glycol diacrylates and dimethacrylates, 1,4-butanediol and poly-n-butylene oxide glycol diacrylates and dimethacrylates, propylene glycol and polypropylene oxide glycol diacrylates and dimethacrylates, thiodiethylene glycol diacrylate and dimethacrylate, di-(2-hydroxyethyl)-sulfone diacrylate and dimethacrylate, neopentyl glycol diacrylate and dimethacrylate, trimethylolpropane tri- and tetra-acrylate, pentaerythritol tri- and tetra-acrylate, divinylbenzene, divinyl ether, divinylsulfone, disiloxanyl-bis-3-hydroxypropyl diacrylate or methacrylate and related compounds. Ethylene glycol dimethacrylate is preferred.

It is also possible to use as additional cross-linking components f) macromers of formula Va

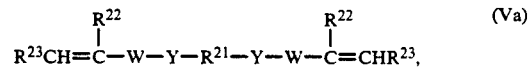

wherein $R^{21}$ is a polysiloxane chain having a molecular weight of about 400 to about 8000 and has the formula

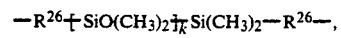

$R^{22}$ is hydrogen or methyl, $R^{23}$ is hydrogen or —COOR$^{24}$, $R^{24}$ is hydrogen or alkyl having from 1 to 10 carbon atoms, with the proviso that at least one of the radicals $R^{22}$ and $R^{23}$ is hydrogen, W is —O—, —COO— or —CONR$^{25}$—, $R^{25}$ is hydrogen or alkyl having from 1 to 5 carbon atoms, $R^{26}$ is branched or linear alkylene having from 1 to 7 carbon atoms or is $(CH_2CH_2O)_qCH_2CH_2$ wherein q is a number from 1 to 20, k is an integer from 3 to 120, Y is a direct bond or the divalent radical —R$^{27}$—X$^3$—CONH—R$^{28}$—NHCO—X$^4$—, $R^{27}$ is linear or branched alkylene having from 2 to 5 carbon atoms that is bonded to W and is unsubstituted or substituted by di-lower alkylamino or by hydroxy, $R^{28}$ is a divalent radical that is obtained by removal of the NCO groups from an aliphatic, cycloaliphatic or aromatic diisocyanate, $X^3$ is —O— or —NR$^{25}$—, $X^4$ has the same meaning as $X^3$ or is —S— and is bonded to $R^{26}$, with the proviso that when W is —O—, Y is other than a direct bond, and $R^{22}$ and $R^{23}$ are hydrogen, or macromers of formula Vb

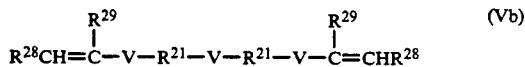

wherein $R^{28}$ and $R^{29}$ are each independently of the other hydrogen or methyl, V is the divalent radical —$R^{30}$—$R^{31}$—NHCO—$X^4$— which is bonded to $R^{21}$ via $X^4$ and wherein $R^{30}$ is phenylene or lower alkyl-substituted phenylene, $R^{31}$ is a bond or lower alkylene, and wherein $R^{21}$ and $X^4$ are as defined above.

The invention also relates to the use of macromers that are mixed types of compounds of formulae Va and Vb, that is to say compounds in which a polysiloxane chain $R^{21}$ carries a radical $R^{23}$CH=C($R^{22}$)—W—Y— at one end and a radical $R^{28}$CH=C($R^{29}$)—V— at the other end.

In accordance with the definitions of $R^{22}$ and $R^{23}$, when W is —COO— or CONR$^{25}$—, the terminal radicals of compounds of formula Va are the acyl radicals of acrylic or methacrylic acid or the monoacyl radicals of maleic or fumaric acid or of monoalkyl esters of those acids with straight-chain or branched alkanols having from 1 to 10 carbon atoms, such as methanol, ethanol, butanol, isobutyl alcohol or decanol, or, when W is oxygen (oxa), the vinyloxy radical of vinyl ethers.

Compounds of formula Va wherein Y is a direct bond are diesters of macromolecular diols in which hydroxy groups are bonded to the polycondensate chain $R^{21}$, with α,β-unsaturated acids. Such esters can be prepared from the macromolecular diol in accordance with generally known acylation methods using reactive functional derivatives of suitable acids, for example chlorides of acrylic or methacrylic acid, or monoalkyl esters of maleic or fumaric acid; or using maleic acid anhydride.

In accordance with the definition of formula Va, Y can also be a divalent radical —$R^{27}$—$X^3$—CONH—$R^2_8$—NHCO—$X^4$—, wherein $R^{27}$ is, for example, methylene, propylene, trimethylene, tetramethylene, pentamethylene, neopentylene (2,2-dimethyltrimethylene), 2-hydroxytrimethylene or 1-(dimethylaminomethyl)-ethylene and especially ethylene. The divalent radical $R^{28}$ is derived from an organic diisocyanate and is an aliphatic radical, such as alkylene, for example ethylene, tetramethylene, hexamethylene, 2,2,4-trimethylhexamethylene, 2,4,4-trimethylhexamethylene; fumaroyldiethylene or 1-carboxypentamethylene; a cycloaliphatic radical, for example 1,4-cyclohexylene or 2-methyl-1,4-cyclohexylene; and an aromatic radical, such as m-phenylene, p-phenylene, 2-methyl-m-phenylene; 1,2-, 1,3-, 1,5-, 1,6-, 1,7-, 1,8-, 2,3- and 2,7-naphthylene, 4-chloro-1,2- and 4-chloro-1,8-naphthylene, 1-methyl-2,4-, 1-methyl-2,7-, 4-methyl-1,2-, 6-methyl-1,3- and 7-methyl-1,3-naphthylene, 1,8-dinitro-2,7-naphthylene, 4,4'-biphenylene, 3,3'-dichloro-4,4'-biphenylene, 3,3'-dimethoxy-4,4'-biphenylene, 2,2'-dichloro-5,5'-dimethoxy-4,4'-biphenylene, methylene-di-p-phenylene, methylene bis(3-chlorophenylene), ethylene di-p-phenylene or oxy-di-p-phenylene. If Y in the formula Va is not in the form of a direct bond, then $R^{27}$ is always bonded to W.

$R^{21}$ is derived especially from macromeric diols, diamines or dithiols having a molecular weight (MW) of from 200 to 8000. Further details, especially the preparation of the compounds of formula Va, are described in U.S. Pat. No. 4,136,250.

The preferred siloxane macromers of formula Va have a molecular weight in the range from about 600 to about 8500 and include a polysiloxanediol having a molecular weight of from about 400 to about 8000 that has first been terminated by isophorone diisocyanate or tolylene-2,4-diisocyanate and has then been reacted with a hydroxy compound selected from the hydroxyalkyl esters, in which alkyl has from 2 to 4 carbon atoms, of acrylic acid, methacrylic acid, maleic acid and fumaric acid, and the hydroxyalkylvinyl ethers in which alkyl has from 2 to 4 carbon atoms.

The hydroxy compound is preferably 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2,3-dihydroxypropyl acrylate or 2,3-dihydroxypropyl methacrylate. The most preferred hydroxy compound is 2-hydroxyethyl methacrylate. Preferred diisocyanates are tolylene-2,4-diisocyanate and isophorone diisocyanate.

The definitions and preferred meanings indicated for compounds of formula Va also apply to compounds of formula Vb insofar as they are appropriate, that is to say, for example, for $R^{21}$. Preferably, in the compounds of formula Vb $R^{28}$ is hydrogen, $R^{29}$ is methyl, $R^{30}$ is phenylene or $C_1$-$C_4$alkyl-substituted phenylene, $R^{31}$ is $C_1$-$C_4$alkylene and $X^4$ is oxygen.

The preferred siloxane macromers of formula Vb have a molecular weight in the range of about 600 to about 8500 and include a polysiloxanediol having a molecular weight of from about 400 to about 8000 that has been terminated by a monoisocyanate of the formula $R^{28}$CH=C($R^{29}$)—$R^{30}$—$R^{31}$—NCO, wherein $R^{28}$ is hydrogen, $R^{29}$ is methyl, $R^{30}$ is phenylene or $C_1$-$C_4$alkyl-phenylene and $R^{31}$ is $C_1$-$C_4$alkylene, especially, for example, 2,2-propylene.

The mixtures according to the invention to be polymerised are preferably free of silanolfunctionalised (meth)acrylates.

The proportions of the components in the mixture to be polymerised or in the polymer are as follows (in % by weight):
a) 20–60% siloxane monovinyl component
b) 1–25% siloxane oligovinyl component
c) 10–55% fluorine-containing vinyl component
d) 3–30% hydrophobic vinyl component having a bulky hydrocarbon radical
e) 0–10% hydrophilic vinyl component
f) 0–15% additional cross-linking vinyl component Preferred proportions of components a) to f) are:
a) 30–45%
b) 2–15%
c) 15–50%
d) 3–30%
e) if present, 5–10%
f) if present, 5–10%.

Especially preferred proportions of components a) to f) are:

a) 40–45%
b) 5–10%
c) 29–40%
d) 3–15%
e) if present, 5–10%
f) if present, 5–10%.

Proportions of components e) and/or f) of 8–10% each are especially preferred.

The following proportions of components a) to f) are most especially preferred:
a) 35–40%
b) 5–10%
c) 29–35%
d) 3–10%
e) 8–10%
f) 8–10%.

In cases where there are 5% or more of component f), that component is preferably a compound of formula V.

The vinyl components to be used according to the invention are known and are in some cases commercially available or they can be prepared in a manner known per se. The preparation of the macromers of formula V is described, for example, in U.S. Pat. No. 4,136,250.

The polymers according to the invention are produced, for example, by photopolymerisation, thermal polymerisation or by radical copolymerisation, either in the dry state or in the presence of small amounts of solvent. The polymerisation is advantageously carried out at elevated temperature, preferably in the presence of an initiator that forms free radicals, for example at a temperature in the range from approximately 30° C. to approximately 105° C. These initiators are preferably peroxides or azo catalysts having a half-value period of at least 20 minutes at the polymerisation temperature. Typical examples of peroxy compounds that can be used are isopropyl percarbonate, tert-butyl peroctoate, benzoyl peroxide, lauroyl peroxide, decanoyl peroxide, acetyl peroxide, succinic acid peroxide, methyl ethyl ketone peroxide, tert-butyl peroxyacetate, propionyl peroxide, 2,4-dichlorobenzoyl peroxide, tert-butyl peroxypivalate, pelargonyl peroxide, 2,5-dimethyl-2,5-bis(2-ethylhexanoylperoxy)hexane, p-chlorobenzoyl peroxide, tert-butyl peroxybutyrate, tert-butyl peroxymaleic acid, tert-butyl peroxyisopropyl carbonate and bis(1-hydroxycyclohexyl) peroxide.

Azo compounds include 2,2'-azo-bis-isobutyronitrile, 2,2'-azo-bis(2,4-dimethylvaleronitrile), 1,1'-azo-bis(cyclohexanecarbonitrile) and 2,2'-azo-bis(2,4-dimethyl-4-methoxyvaleronitrile).

Suitable initiators are also photoinitiators, benzoin ethers, Darocure types (Merck) or Irgacure types (CIBA-GEIGY).

It is also possible to use other mechanisms that form free radicals, such as irradiation with, for example, X-rays, electron beams and UV radiation.

The amount of initiator can vary from 0.01 to 1.5% by weight, based on constituents a) to f), but is preferably from 0.01 to 0.5% by weight.

The monomers to be polymerised are advantageously purified before polymerisation, especially to remove the inhibitors with which they are stabilised. For example, they are washed with suitable dilute aqueous bases, such as alkali metal hydroxides, for example sodium hydroxide solution, and purified by distillation under mild temperature conditions.

The polymerisation mixtures can be polymerised in a manner known per se, for example in cylindrical form, for example by subjecting them, in closed cylindrical molds (tubes), to a temperature program in which the temperature is increased in stages from 30° C. to about 100° C. The temperature stages can be, for example, from 5° to 10° C., with a dwell time of from 1 to 12 hours at each temperature. Two- or five-hour intervals are customary but the individual temperatures may also be maintained for up to 20 hours. Finally, tempering is usually carried out for from 1 to 15 hours at temperatures of from 80° to 130° C.

The contact lenses according to the invention can also be manufactured in a manner known per se. For that purpose, for example, the vinyl components are polymerised in cylindrical form, and after demoulding the resulting rods are divided into discs or buttons which can be subjected to further mechanical processing, especially by turning processes. Alternatively, the polymerisation can be carried out in lens molds, so that lens blanks are obtained directly in the form of polymers. In addition, contact lenses can be manufactured by polymerisation of the vinyl components in suitable molds directly ("full mold" process) or with only one finished surface ("semi mold" process).

The reaction is preferably carried out under an inert atmosphere when it is carried out in open molds. It is known that oxygen inhibits polymerisation and results in prolonged polymerisation times. When closed molds are used for forming the polymer, the molds consist of inert materials having low oxygen permeability and non-adhesive properties. Examples of suitable mold materials are polytetrafluoroethylene, such as Teflon ®, silicone rubber, polyethylene, polypropylene and polyester, such as Mylar ®. It is also possible to use glass or metal molds if a suitable demolding agent is employed.

The following Examples illustrate the subject of the invention but do not limit the invention, for example to the scope of the Examples. Quantities given in percent are percentages by weight, unless expressly indicated to the contrary. Temperatures are given in degrees Celsius.

The abbreviations used have the following meanings:
A1: tris(trimethylsiloxy)silylpropyl methacrylate
A2: tris(tris(trimethylsiloxy)siloxy)silylpropyl methacrylate
B1: 3,5-bis(3-methacroyloxy-propyl)-3,5-bis(trimethylsiloxy)-1,1,1,7,7,7-hexamethyltetrasiloxane
B2: 1,3-dimethacryloxypropyl-tetramethyldisiloxane
C1: 2,2,2-trifluoroethyl methacrylate
C2: 2,2,3,3-tetrafluoropropyl methacrylate
C3: 2,2,3,3,4,4,5,5-octafluoropentyl methacrylate
C4: hexafluoroisopropyl methacrylate
C5: hexafluoro-bisphenol-A bismethacrylate
C6: tridecafluorononanediol dimethacrylate (compound of formula IIId wherein $R^9$ is tridecafluorohexyl)
D1: 3,3,5-trimethylcyclohexyl methacrylate
D2: isobornyl methacrylate
D3: neopentyl methacrylate
D4: tricyclo[5.2.1.0]decyl methacrylate
E1: methacrylic acid
F1: reaction product of poly(dimethylsiloxane)-di(alkyleneol) with 2 equivalents of isophorone diisocyanate and then with 2 equivalents of hydroxyethyl methacrylate
F2: ethylene glycol dimethacrylate

EXAMPLES

General instructions for the preparation of the polymers:

The monomers are mixed together in the given ratio (see Tables). Any polymerisation inhibitors present are removed beforehand by washing with an aqueous base. After the addition of 0.1% photoinitiator (benzoin ether, DAROCUR or IRGACUR), the mixture is stirred and then freed of oxygen using conventional techniques. The monomer mixture is irradiated in plastics molds for 0.5–6 hours with UV light, the wavelength of which is matched to the photoinitiator. The blanks are then tempered for 1–5 hours at 80°–130° C./1–500 Pa.

The oxygen permeability is determined according to FATT using 0.2 mm thick discs, and the ball indentation hardness is determined in accordance with DIN 53 456 at a load of 358N.

COMPARISON EXAMPLES 1–3

Oxygen permeability (Dk) and ball indentation hardness (BIH) of the tempered copolymers consisting of a 1:1 monomer mixture (substance content in %)

| No. | Monomer | | $Dk \dfrac{10^{11} m1O_2 \times cm}{cm^2 \times s \times mm\ Hg}$ | BIH (N/mm²) |
|---|---|---|---|---|
| 1 | D1 | MMA* | 11 | 177 |
| 2 | D1 | C2 | 12 | 155 |
| 3 | D1 | C3 | 13 | 107 |

*MMA = methyl methacrylate

COMPARISON EXAMPLES 4–7

| | Monomer content (%) | | | |
|---|---|---|---|---|
| No. | A1 | B1 | C1 | MMA* |
| 4 | 30 | 10 | 30 | 30 |
| 5 | 40 | 10 | 30 | 20 |
| 6 | 40 | 10 | 40 | 10 |
| 7 | 44.7 | 11.1 | 33.5 | 10.7 |

*MMA = methyl methacrylate

MATERIAL PROPERTIES OF COMPARISON EXAMPLES 4–7

| | 4 | 6 | 6 | 7 |
|---|---|---|---|---|
| Dk* | 34 | 58 | 76 | 86 |
| BIH* | 74 | 62 | 57 | 52 |

*Units as in Comparison Examples 1–3

TABLE 1

(Examples 1–5)

| | Monomer content (%) | | | | | |
|---|---|---|---|---|---|---|
| Example | A1 | B1 | C | D1 | E1 | F2 |
| 1 | 30 | 10 | 30 | 30 | — | — |
| 2 | 40 | 10 | 30 | 20 | — | — |
| 3 | 40 | 10 | 40 | 10 | — | — |
| 4 | 45 | 10 | 30 | 15 | — | — |
| 5 | 40 | 12.5 | 25 | 12.5 | 5 | 5 |

MATERIAL PROPERTIES OF EXAMPLES 1–5

| | 1 | 2 | 3 | 4 | 5 |
|---|---|---|---|---|---|
| Dk* | 57 | 78 | 91 | 110 | 85 |
| BIH* | 78 | 63 | 55 | 54 | 65 |

*Units as in Comparison Examples 1–3

TABLE 2

(Examples 6–19)
The category and amount (in %) of each vinyl component are given.

| No. | Type a) | Type b) | Type c) | Type d) | Type e) | Type f) | Dk | BIH |
|---|---|---|---|---|---|---|---|---|
| 6 | A1 (43) | B1 (2) | C1 (10) + C6 (30) | D1 (15) | — | — | 114 | 56 |
| 7 | A1 (35) | B1 (10) | C1 (10) + C6 (30) | D1 (15) | — | — | 110 | 61 |
| 8 | A2 (45) | B1 (10) | C1 (15) | D1 (30) | — | — | 70 | 65 |
| 9 | A1 (45) | B2 (10) | C1 (30) | D1 (15) | — | — | 110 | 60 |
| 10 | A1 (43) | B2 (2) | C1 (30) + C5 (5) | D1 (10) | E1 (10) | — | 70 | 80 |
| 11 | A1 (45) | B1 (10) | C1 (30) | D2 (15) | — | — | 91 | 61 |
| 12 | A1 (45) | B1 (10) | C1 (30) | D3 (15) | — | — | 117 | 56 |
| 13 | A1 (45) | B1 (10) | C4 (30) | D1 (15) | — | — | 138 | 52 |
| 14 | A1 (45) | B1 (10) | C4 (40) | D1 (5) | — | — | 151 | 48 |
| 15 | A1 (40) | B1 (9) | C1 (29) | D1 (3) | E1 (9) | F1 (10) | 118 | 54 |
| 16 | A1 (35) | B1 (5) | C1 (35) | D1 (5) | E1 (10) | F1 (10) | 92 | 61 |
| 17 | A1 (30) | B1 (14) | C4 (39) | D1 (3) | E1 (9) | F1 (5) | 120 | 63 |
| 18 | A1 (43) | B1 (2) | C4 (40) + C6 (10) | D1 (5) | — | — | 142 | 52 |

*Units as in Comparison Example 1–3

What is claimed is:

1. A contact lens comprising a polymer that is a copolymerization product of a monomer mixture comprising the following monomers:

a) about 20–60% of a siloxane monovinyl component of formula I

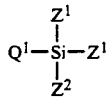

wherein $Q^1$ is a radical of the partial formula

Ac is the acyl radical of a vinylically unsaturated carboxylic acid having from 3 to 5 carbon atoms, $R^1$ and $R^2$ are each independently of the other lower alkylene, cycloalkylene, arylene or a combination of lower alkylene with cycloalkylene or lower alkylene with arylene, $R^3$ is lower alkylene or cycloalkylene, A and $A^1$ are each independently of the other $X^1$—CO—$X^2$, $X^2$ in each case being bonded to $R^2$, and $X^2$ is —NH— or a bond and $X^1$ is —O—, or —NR— wherein R is lower alkyl, wherein the radicals $Z^1$ are each independently of the other $OSi(R^4)_3$ wherein the radicals $R^4$ are each independently of the others lower alkyl, phenyl or OSi (lower alkyl)$_3$, $Z^2$ is lower alkyl, phenyl or $Z^1$, and n is 0 or 1, b) about 1–25% of a siloxane oligovinyl component of formula II

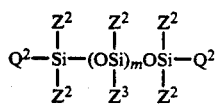

wherein $Q^2$ has the same meaning as $Q^1$ or is Ac—O, wherein $Q^1$, Ac and $Z^2$ are as defined above, $Z^3$ is $Z^2$ or has the same meaning as $Q^2$ and m is 0 to 4, c) about 10–55% of a fluorine-containing vinyl component of formula IIIa Ac—O—R$^5$—R$^6$ wherein Ac is as defined above, $R^5$ is $C_1 C_4$alkylene or cycloalkylene, $R^6$ is fluorinated lower alkyl having at least 3 fluorine atoms or wherein $R^5$—$R^6$ together are hexafluoroisopropyl or nonafluoro-tert-butyl, or of formula IIIb Ac—O—R$^5$—R$^7$—R$^5$—O—Ac wherein Ac and $R^5$ are as defined above and $R^7$ is fluorinated $C_1$–$C_{10}$alkylene, or of formula IIIc Ac—O—R$^8$—C(CF$_3$)$_2$—R$^8$—O—Ac wherein Ac is as defined above and $R^8$ is phenylene that is unsubstituted or substituted by lower alkyl, fluorine or by fluorinated lower alkyl having at least 3 fluorine atoms, or of formula IIId R$^9$—(CH$_2$)$_p$—CH(OAc)—CH$_2$—OAc wherein Ac is as defined above, $R^9$ is perfluorinated $C_1$–$C_{10}$alkyl and p is 0, 1 or 2, or of formula IIIe

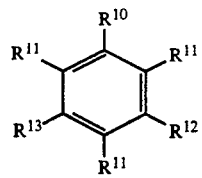

wherein $R^{10}$ is $C_2$–$C_6$alkenyl having the double bond in conjugation to the phenyl ring, the radicals $R^{11}$ are each independently of the others hydrogen or fluorine, $R^{12}$ is fluorinated lower alkyl having at least 3 fluorine atoms and $R^{13}$ is hydrogen or fluorine or has the same meaning as $R^{12}$, and d) about 3–30% of a hydrophobic vinyl component having a bulky hydrocarbon radical of formula IVa Ac—O—R$^{14}$ wherein Ac is as defined above and $R^{14}$ is lower alkyl-substituted cycloalkyl, lower alkyl-substituted cycloalkyl-lower alkyl, unsubstituted or lower alkyl-substituted di- or oligo-cycloalkyl, unsubstituted or lower alkyl-substituted di- or oligo-cycloalkyl-lower alkyl, or $C_5$–$C_{10}$alkyl that contains at least one tert-butyl group and is unsubstituted or substituted by cycloalkyl, or of formula IVb

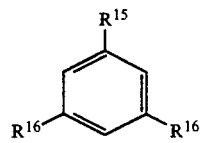

wherein $R^{15}$ is $C_2$–$C_6$alkenyl having the double bond in conjugation to the phenyl ring and $R^{16}$ is hydrogen or has the same meaning as $R^{14}$, but at least one radical $R^{16}$ is other than hydrogen, e) about 0–10% of a hydrophilic vinyl component and f) about 0–15% of an additional cross-linking vinyl component.

* * * * *